US007231037B2

(12) United States Patent
Hansen et al.

(10) Patent No.: US 7,231,037 B2
(45) Date of Patent: Jun. 12, 2007

(54) ACTIVE AUDIO COMPRESSING IN TELECOMMUNICATION

(75) Inventors: Niels Christian Steen Hansen, Solrod Strand (DK); Ole N. Christensen, Solrod Strand (DK)

(73) Assignee: Sennheiser Communications A/S, Solrød Strand (DK)

( * ) Notice: Subject to any disclaimer, the term of this patent is extended or adjusted under 35 U.S.C. 154(b) by 97 days.

(21) Appl. No.: 10/508,135

(22) PCT Filed: Mar. 19, 2003

(86) PCT No.: PCT/DK03/00188

§ 371 (c)(1), (2), (4) Date: Nov. 18, 2004

(87) PCT Pub. No.: WO03/079722

PCT Pub. Date: Sep. 25, 2003

(65) Prior Publication Data

US 2005/0105718 A1 May 19, 2005

(30) Foreign Application Priority Data

Mar. 20, 2002 (DK) .............................. 2002 00433

(51) Int. Cl.
*H04M 1/00* (2006.01)
*H04M 9/00* (2006.01)

(52) U.S. Cl. ....................... 379/412; 381/72; 381/73.1; 381/74; 381/75; 381/94.8

(58) Field of Classification Search ................ 379/412; 381/72–75, 94.8
See application file for complete search history.

(56) References Cited

U.S. PATENT DOCUMENTS 3,991,272 A * 11/1976 Tarr .......................... 381/108
4,224,470 A * 9/1980 Persson et al. ............... 381/72
4,944,015 A 7/1990 Juve et al.
5,235,637 A * 8/1993 Kraz et al. ............. 379/388.03
5,369,711 A * 11/1994 Williamson, III ........... 381/104
5,485,514 A 1/1996 Knappe et al.
5,602,902 A 2/1997 Satterlund et al.
6,473,495 B1 10/2002 Willer
6,980,647 B1 * 12/2005 Daugherty et al. ......... 379/412

FOREIGN PATENT DOCUMENTS

| | | |
|---|---|---|
| AU | 83010022 | 7/1983 |
| GB | 2120903 | 12/1983 |
| WO | 9501668 | 1/1995 |

* cited by examiner

*Primary Examiner*—Ramnandan Singh
(74) *Attorney, Agent, or Firm*—Dykema Gossett PLLC

(57) ABSTRACT

An output reducing system for a telephone system, e.g., implemented in a headset, includes an input line and an output line, wherein the input line transmits an incoming signal to an output transducer and the output line transmits an outgoing signal from an input transducer, and a compressor system is provided in the input line for reducing the output signal level.

3 Claims, 3 Drawing Sheets

R+
R1
D1
D
Q1
G
S
C1
SPEAKER
R-

Headset speaker sound pressure.

ACTIVE AUDIO COMPRESSING IN TELECOMMUNICATION

AREA OF THE INVENTION

The invention relates to telecommunication systems and headsets, especially but not only headsets for telecommunication purposes. Such telecommunication system and headset comprises a microphone for receiving a near signal to be transferred away from a user and an output transducer for outputting a remote signal transferred to the user.

BACKGROUND OF THE INVENTION

In the following reference is only made to a headset. It should be appreciated that the system also relates to similar functioning parts of telecommunication systems, such as handsets and connected devices. It is well known that shocks occasionally occur in telecommunication systems. These shocks are impulses of a significant voltage, which when they are transferred to the telephone and the headset are ejected as equivalently high sound levels to the headset user's ear or ears. The sound pressure level may be as high as 130 to 140 dB. It is fair to say that the headset itself does not cause the shock but only transmits this to the wearer of the headset. It is evident that when subjected to such signal, the user may suffer hearing damage and in addition to this may experience a shock condition.

When using a normal handset of a telephone, the user may, due to the fact that this is held by hand, quickly remove this from the ear and thereby avoid significant damage from the shock. When a headset is used in connection with a telecommunication system, the output transducer will normally be placed in a fixed position in relation to an ear and maintained in position by means of a hook over the ear or a headband. The removal is hereby not effected as quickly as in connection with the handset, which leads to an increased risk of damage of the hearing. A headset is however necessary for many receptionists and call centre employees due to the nature of their job, and due to the fact that these groups are using the telephone for a significant number of hours every day, making the use of a handset impossible, or at least less practical.

Due to this situation a number of attempts have been made to cope with the problem of the shock. The most common attempt comprises placing in parallel with the output transducer a number of diodes having the function of cutting the signal to a certain extent when a shock arises. This is however not very effective and there is still a significant risk that the occurrence of a shock may lead to damage of the hearing ability of a headset user.

For this reason there is a need for improving the headset and/or the telephone system in a manner that improves the ability of the headset to resist the transmission of the shock arising in the telephone system to the headset user.

SUMMARY OF THE INVENTION

The main objective of the present invention is therefore to improve a telephone system in a manner that improves the ability of the system to resist the transmission of the shock arising in the telephone system to the headset user.

According to the invention this objective is achieved by means of a system wherein a compressor system is used in conjunction with the input line to reduce the output signal level.

By making the construction in this manner the output signal will immediately be reduced when the input signal reaches a certain level. Thereby, the immediate risk of damaging the hearing of the telephone system user is significantly reduced by a system that can provide its function independent of additional power supply, i.e., the system relies entirely on the power supplied by the telephone line.

The compressor circuit may in a preferred embodiment be adapted to be operable on the audio signal alone, without additional power supply.

In a preferred embodiment the compressor system may comprise an electronically adjustable shunt resistance mounted in parallel with the speaker, and being realised by a MOS-FET transistor, a fall resistance in series with the speaker and the shunt resistance as well as a rectifier and peak detection/doubler circuit in the form of two schottky diodes and two capacitors. The system further comprises a DC separating capacitor, two capacitors for controlling the attack and release times for the attenuation as well as a protecting Zener diode.

The increase in the output signal at increasing input levels above an accepted maximum (in a circuit without PTC resistance) is not dependent of the time during which the input signal has been applied, but depends on the fact that the MOS-FET transistor has reached its minimum resistance value and that an increased input signal hereafter will not give rise to any attenuation of the signal. In this situation a change of the resistance to a PTC resistance will smoothen the output, as the PTC resistance will be heated due to the effect applied to it and hence give rise to a significant increase in resistance When the shock signal climbs to a certain level the transistor will not be able to clamp the signal further and therefore raise will be seen on the output.

By including a variable resistance in the input line, remedy may be provided for this situation and the output level will even be reduced more than before.

Preferably the resistance is automatically variable in response to the load.

In a preferred embodiment the resistance is a so-called PTC resistance (Positive Temperature Coefficient).

The system as explained in the foregoing may advantageously be built into a headset, hereby enabling the application of an effective output reduction system in connection with telephone systems without this feature.

The invention will be explained more detailed in the following description of a preferred embodiment with reference to the drawings.

DESCRIPTION OF A PREFERRED EMBODIMENT

Figure 1:
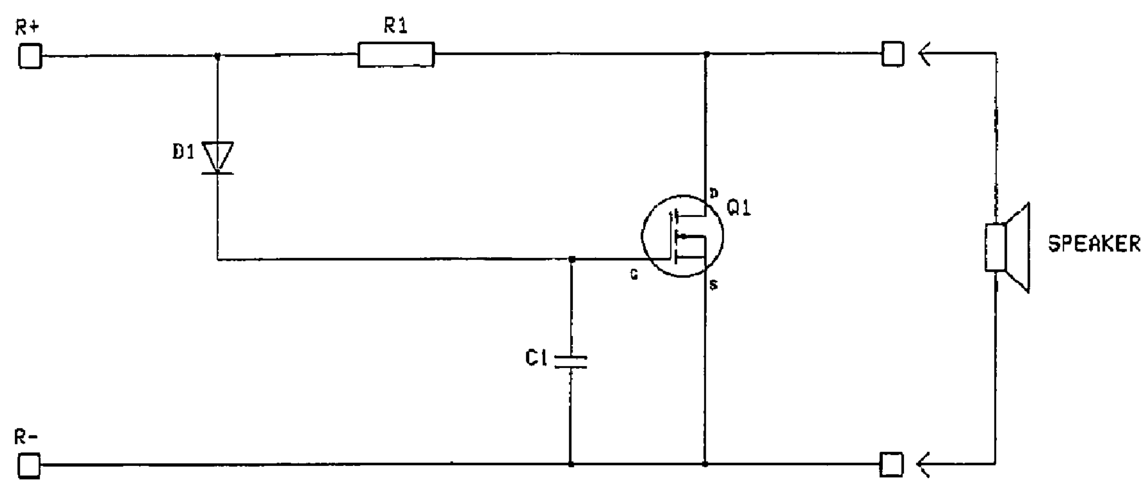
FIG. 1 is a schematic drawing showing the details of a simplified circuitry according to the invention.

The circuitry shown in FIG. 1 comprises an electronically adjustable shunt resistance mounted in parallel with the speaker, and being realised by a MOS-FET transistor, a fall resistance in series with the speaker. D1 represents a rectifier diode and C1 a peak detector.

The audio signal from the telephone is transmitted to the two input terminals R+ and R− and via a small fall resistance to the speaker. The detector circuit simultaneous detects the input signal and this signal is rectified and the peak level is transferred. This detector voltage is transmitted to the gate terminal on the MOS-FET transistor Q1. At normal listening level the detector voltage will not be sufficiently high to activate the MOS-FET transistor Q1, and hence, the circuit will be inactive and the output voltage to the speaker will alone be the voltage relationship between the small fall resistance R1 and the somewhat larger resistance in the speaker. This leads to an insignificant attenuation below IdB. If the audio signal is increased to above the limit for harmful sound pressures, the detector voltage reach a level controlling the MOS-FET transistor Q1 increasingly and have the effect that the resistance of this will drop with the result that the output voltage to the speaker decrease and the sound pressure will be reduced.

At very high level audio signals the power that is left in the circuit can reach very high levels when the resistance R1 is a conventional resistance. Due to this a PTC (Positive Temperature Coefficient) resistance is inserted as resistance R1. At very high audio signals the large effect in the R1 will have the effect that the resistance value in R1 increases and the effect in the circuit will decrease. At the same time the signal to the speaker is further reduced.

Figure 2:
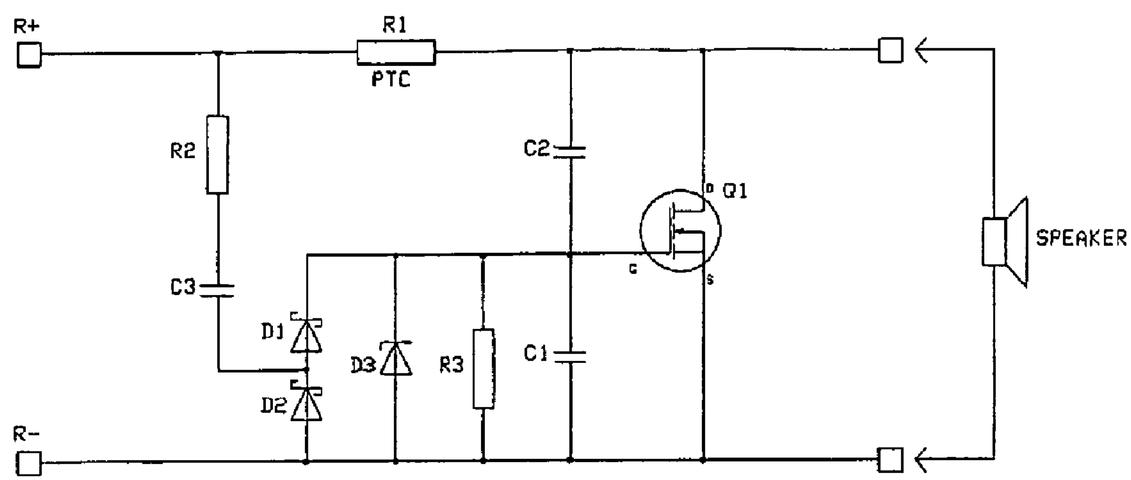
FIG. 2 is a schematic drawing showing the details of a further circuitry according to the invention.

In a preferred embodiment as shown in FIG. 2 the compressor system may comprise an electronically adjustable shunt resistance mounted in parallel with the speaker, and being realised by a MOS-FET transistor Q1, a fall resistance R1 in series with the speaker and the shunt resistance as well as a rectifier D1,D2 and peak detection/doubler circuit C1,C3,D1,D2 in the form of two schottky diodes and two capacitors. The system further comprises a DC separating capacitor C3, two capacitors C1,C2 for controlling the attack and release times for the attenuation as well as a protecting Zener diode D3.

Figure 3:
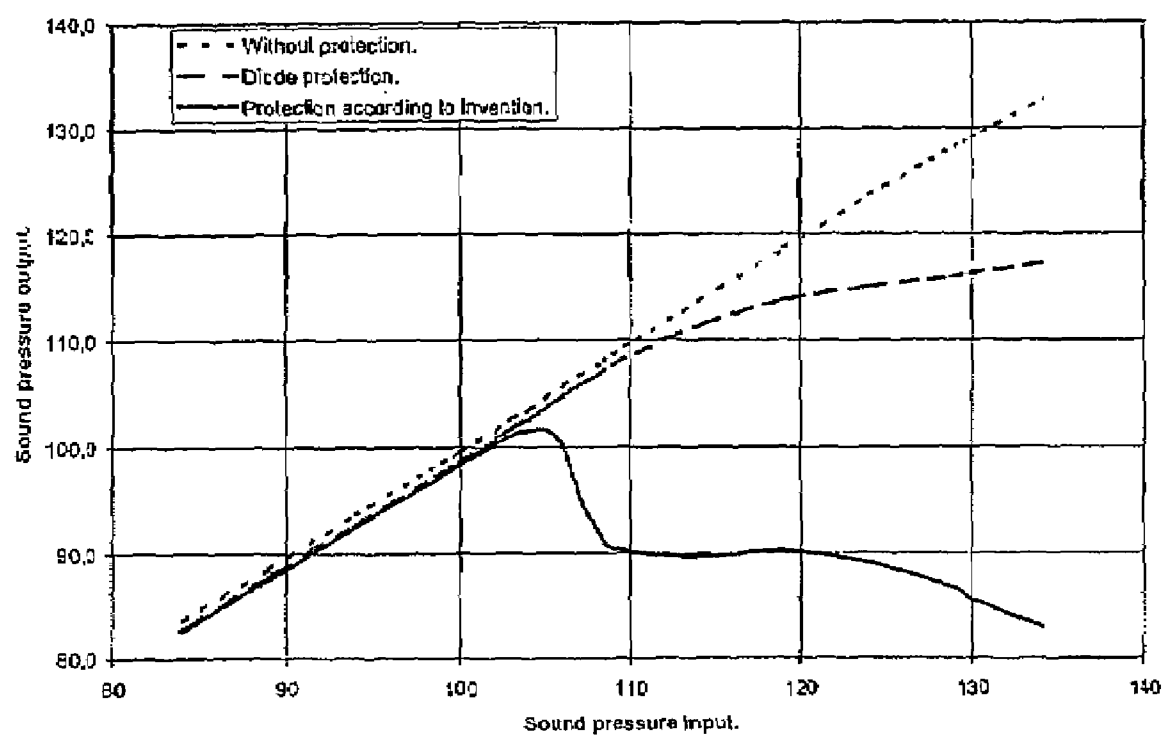
FIG. 3 is a diagram showing the attenuation of the output signal in relation to the input signal in different situations.

FIG. 3 is a diagram showing the attenuation of the output signal in relation to the input signal in different situations.

The curves show the sound pressure produced by a headset as a function of the sound pressure applied.

The first curve marked: “Without protection”, for a headset without built-in protection shows that the sound pressure output equals the sound pressure input.

The second curve marked “Diode protection”, for a headset with built-in protection in the form of a fall resistance and back-to-back diodes in parallel with the speaker, shows that the increase in the sound pressure output is reduced at sound pressures above 110 dB and reaches a level at 118 dB at a sound pressure input at 134 dB.

The third curve marked “Protection according to invention”, for a headset with a preferred embodiment of the present invention. The curve shows the unique “foldback sound limiting” characteristic, where the sound pressure output follows the sound pressure input until the circuitry reaches a predetermined detector voltage level at 102 dB. At this level the sound pressure output is attenuated to a comfortable level of 90 dB when the sound pressure input exceeds detector voltage and the sound pressure level of 90 dB is maintained even if the applied sound pressure is increased above approx. 134 dB. As soon as the sound pressure input falls below the detector voltage level of 102 dB the circuit is deactivated and the sound pressure output follows the sound pressure input.

The invention claimed is:

1. An output reducing system for use at an end of a telephone system, the output reducing system comprising an input line and an output line, where the input line receives an incoming audio signal with an input signal level and transmits an incoming signal to a speaker and where the output line transmits an outgoing signal from an input transducer, and a compressor system in the input line for reducing an output signal level, wherein said compressor system comprises: an electronically adjustable shunt resistance mounted in parallel with the speaker and consisting of a MOS-FET transistor, a fall resistance in series with the speaker, said fall resistance being variable in response to the input signal level applied on the input line and is a positive temperature coefficient resistance, and a rectifier diode and a capacitor acting as a peak detector.

2. A system according to claim 1, wherein the compressor is adapted to be operable on the incoming audio signal alone, without additional power supply.

3. A headset including an output reducing system according to claim 1.

* * * * *